United States Patent

Fukaya et al.

[11] Patent Number: 5,545,377
[45] Date of Patent: Aug. 13, 1996

[54] CATALYST DEGRADATION DETECTING APPARATUS

[75] Inventors: Kenji Fukaya, Chiryu; Kazuo Hayashi, Chita-gun; Makoto Hori, Ogaki; Masahiro Hamaya, Anjo; Minoru Ohta, Okazaki, all of Japan

[73] Assignee: Nippondenso Co., Ltd., Kariya, Japan

[21] Appl. No.: 391,652

[22] Filed: Feb. 17, 1995

[30] Foreign Application Priority Data

| Feb. 18, 1994 | [JP] | Japan | 6-020909 |
| Nov. 8, 1994 | [JP] | Japan | 6-273509 |
| Dec. 27, 1994 | [JP] | Japan | 6-324693 |

[51] Int. Cl.$^6$ ............ G05D 9/00; F01N 3/00
[52] U.S. Cl. ............ 422/108; 422/171; 60/276; 60/299; 60/303; 60/308; 436/37
[58] Field of Search .............. 422/108, 171; 60/299, 303, 308, 276; 436/37

[56] References Cited

U.S. PATENT DOCUMENTS

| 5,077,970 | 1/1992 | Hamburg | 60/274 |
| 5,119,628 | 6/1992 | Uema | 60/274 |
| 5,154,055 | 10/1992 | Nakane et al. | |
| 5,279,116 | 1/1994 | Shimzu et al. | 60/274 |
| 5,301,501 | 4/1994 | Shimizu et al. | 60/274 |
| 5,313,791 | 5/1994 | Hamburg et al. | 60/274 |
| 5,363,647 | 11/1994 | Uhuchi et al. | 60/276 |
| 5,390,490 | 2/1995 | Brooks | 60/276 |
| 5,426,937 | 6/1995 | Ohuchi et al. | 60/276 |

FOREIGN PATENT DOCUMENTS

| 634567 | 1/1995 | European Pat. Off. |
| 0634567 | 1/1995 | European Pat. Off. |
| 4101616 | 8/1991 | Germany |
| 61-286550 | 12/1986 | Japan |
| 63-97852 | 4/1988 | Japan |
| 63-128221 | 8/1988 | Japan |
| 440355 | 2/1992 | Japan |
| 5-98948 | 4/1993 | Japan |
| 5-163989 | 6/1993 | Japan |

*Primary Examiner*—Nina Bhat
*Attorney, Agent, or Firm*—Cushman, Darby & Cushman

[57] ABSTRACT

An exhaust purification device includes a catalytic converter for purifying exhaust gas from an engine, air-fuel ratio sensors provided on the upstream side and downstream side of the catalytic converter, respectively, for detecting the concentration of a specific component in the exhaust gas, a control device for processing the output of the air-fuel ratio sensors and generating a signal based on the processed output, and a catalyst degradation warning device which operates according to the signal generated by the control device for warning an operator of a degraded catalyst, where the responsiveness of the downstream side air-fuel ratio sensor is lower than the responsiveness of the upstream side air-fuel ratio sensor.

22 Claims, 6 Drawing Sheets

| STRUCTURE | UPSTREAM SIDE A/F RATIO SENSOR 1<br>3 ROWS × 8 COLUMNS | DOWNSTREAM SIDE A/F RATIO SENSOR 2<br>2 ROWS × 6 COLUMNS |
|---|---|---|
| OPENING AREA | 75 mm² | 38 mm² |

CATALYST DEGRADATION DETECTING APPARATUS

CROSS REFERENCE TO RELATED APPLICATIONS

This application is based upon and claims priority from Japanese Patent Application No. Hei 6-20909 filed Feb. 18, 1994, Japanese Patent Application No. Hei 6-73509 filed Nov. 8, 1994 and Japanese Patent Application No. Hei 6-324693 filed Dec. 27, 1994, with the contents of each document being incorporated herein by reference.

BACKGROUND OF THE INVENTION

1. Field of the Invention

The present invention generally relates to a catalyst degradation detecting apparatus. More particularly, the present invention relates to a catalyst degradation detecting apparatus in which the concentration of a specific ingredient in exhaust gas is detected by air-fuel ratio sensors provided on an upstream side and downstream side of a catalytic converter which purifies the exhaust gas within an automotive or other type of exhaust system and which generates a signal based on the condition of the degradation of the catalyst. The invention also relates to an air-fuel ratio sensor suitable for use in the above catalyst degradation detecting apparatus.

2. Description of the Related Art

As methods of detecting the degradation of the purifying performance of a catalyst by using air-fuel ratio sensors on the upstream side and downstream side of the catalyst, (1) a method using the ratio of a frequency of outputs from two air-fuel ratio sensors, and (2) a method using an area difference or an area ratio between two air-fuel ratio sensors have conventionally been-available (as disclosed in the Japanese Unexamined Patent Publications Nos. Hei 4-40355, Hei 61-286550). However, since as any of these methods provides ratios or differences of frequencies or areas of the two air-fuel ratio sensors, threshold values are required as reference values against output waveforms of two air-fuel ratio sensors, and depending on the setting method or setting condition for these threshold values, the information obtained from the air-fuel ratio sensors may vary.

In other words, information due to variable factors other than information relating to the catalyst affects the information relating to the variation (degradation) of the purification ratio of the catalyst as described above, and for this reason, the detecting performance is very low.

In addition to this problem, since the air-fuel ratio sensors differ in individual performance characteristics, an erroneous judgment, a suspended judgment or other abnormality may be caused, and the catalyst degradation can not be consistently and reliably detected.

Since differences in responsiveness characteristics of the upstream side and downstream side air-fuel ratio sensors exists, the sensors usually have been selected from the same product lot distribution or the same standard range which are both ±10% of the average sensor responsiveness characteristics.

SUMMARY OF THE INVENTION

An object of the present invention is to provide a catalyst degradation detecting apparatus which takes the differences in performance of the air-fuel ratio sensors into consideration and can consistently and accurately detect the catalyst degradation.

In order to achieve the above object, the inventors of the present invention have earnestly studied the responsiveness characteristics of an upstream side air-fuel ratio sensor and a downstream side air-fuel ratio sensor. The above problem could be solved by using a catalyst degradation detecting apparatus comprising at least a catalytic converter provided for purifying the exhaust gas, air-fuel ratio sensors provided on the upstream side and downstream side, respectively, of the catalytic converter for detecting the concentration of specific components in the exhaust gas, a control device for generating a signal based on the output waveform ratio of the outputs from the air-fuel ratio sensors, and a catalyst degradation warning means which operates according to the signal received from the control device for warning, wherein the responsiveness of the downstream side air-fuel ratio sensor is lower than the responsiveness of the upstream side air-fuel ratio sensor. Preferably the responsiveness of the downstream side air-fuel ratio sensor is lower than the responsiveness of the upstream side air-fuel ratio sensor by a factor of from 20% exclusive to 100% inclusive.

Preferably, a sensor's responsiveness is measured throughout one cycle of output waveforms of a air-fuel ratio sensor.

In the arrangement as described above, a catalyst degradation detecting apparatus and air-fuel ratio sensors which improve the accuracy of the catalyst degradation detection process can be provided.

DETAILED DESCRIPTION OF THE PRESENTLY PREFERRED EXEMPLARY EMBODIMENTS

A first preferred embodiment of the present invention will now be described in detail.

Figure 1:
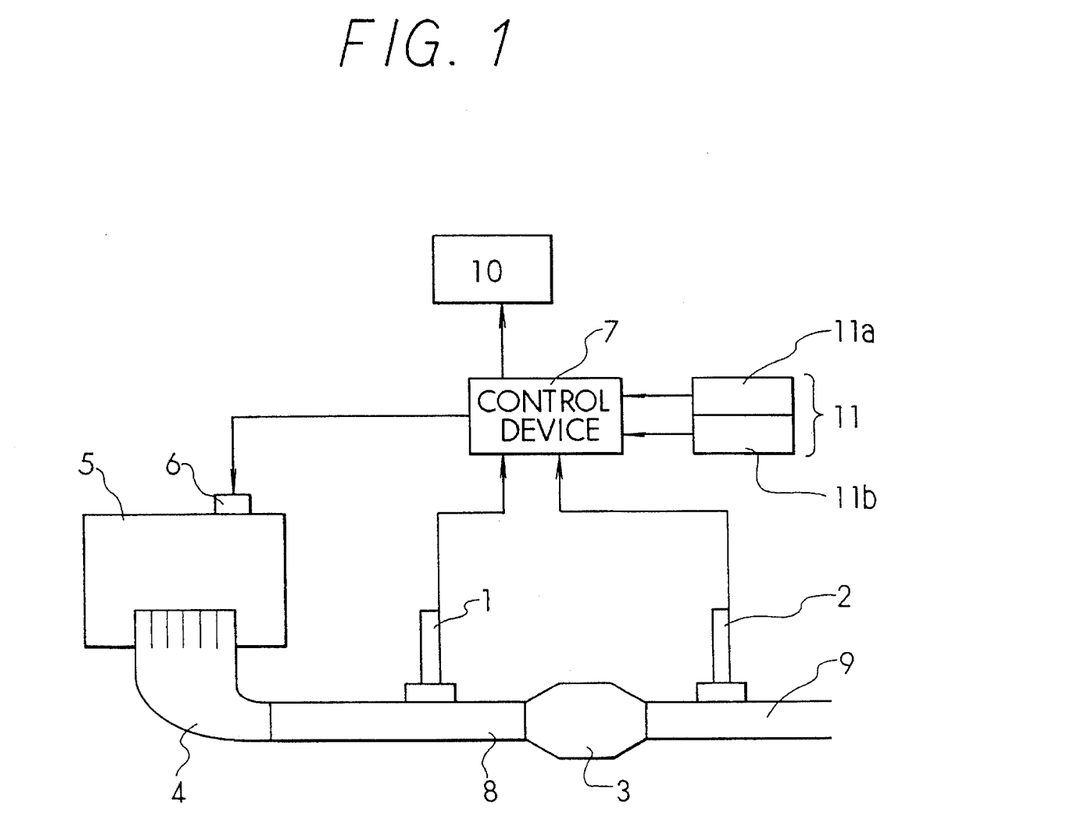
FIG. 1 is a structural diagram illustrating an air-fuel ratio control device according to a preferred embodiment of the present invention.

FIG. 1 illustrates an air-fuel ratio control device according to an embodiment of the present invention. In this figure, reference numeral 1 denotes an upstream side air-fuel ratio sensor, reference numeral 2 denotes a downstream side air-fuel ratio sensor, reference numeral 3 denotes a catalytic converter, reference numeral 4 denotes an exhaust manifold, reference numeral 5 denotes an engine, reference numeral 6 denotes a fuel injection valve, reference numeral 7 denotes a control device, reference numeral 8 denotes a front exhaust pipe, reference numeral 9 denotes a rear exhaust pipe and reference numeral 10 denotes a catalyst degradation warning means.

The front exhaust pipe 8, the catalytic converter 3 and the rear exhaust pipe 9 are mutually connected and disposed downstream from the exhaust manifold 4 connected to the engine 5 in that order. The upstream side air-fuel ratio sensor 1 is attached to the front exhaust pipe 8, while the downstream side air-fuel ratio sensor 2 is attached to the rear exhaust pipe 9. Signals related to the concentration of a specific component in the exhaust gas detected by the upstream side air-fuel ratio sensor 1 and the downstream side air-fuel ratio sensor 2 are processed by the control device 7. At the same time, a signal from a feedback condition setting means 11 including a water temperature sensor 11a and a vehicle speed sensor 11b is inputted into the control device 7. The signals based on the processed signal related to the concentration of the specific component in the exhaust gas detected by the upstream side air-fuel ratio sensor 1 and the downstream side air-fuel ratio sensor 2 and the signal from the feedback condition setting means 11 are sent as feedback signals from the control device 7 to the fuel injection valve 6 attached to the engine 5, and air-fuel ratio control for the engine 5 is performed according to the feedback signals. Furthermore, the signals based on the processed signal related to the concentration of the specific component in the exhaust gas detected by the upstream side air-fuel ratio sensor 1 and the downstream side air-fuel ratio sensor 2 are sent from the control device 7 to the catalyst degradation warning means 10, and a warning is issued to an operator according to the control signal. Specifically, the catalyst degradation warning means 10 is an indicator light or a warning buzzer, for example. In a preferred embodiment, an exhaust emission control device according to the present invention includes the upstream side air-fuel ratio sensor 1, the downstream side air-fuel ratio sensor 2, the control device 7, the front exhaust pipe 8, the rear exhaust pipe 9 and the catalyst degradation warning means 10.

In the exhaust emission control device according to the present invention, the exhaust gas emerging from the engine 5 passes through the exhaust manifold 4 and the front exhaust pipe 8 to the catalytic converter 3. The exhaust gas is purified by an exhaust gas purifying catalyst provided within the catalytic converter 3 and then vented to the atmosphere from the rear exhaust pipe 9. Here, the signals related to the concentration of the specific component in the exhaust gas detected by the upstream side air-fuel ratio sensor 1 and the downstream side air-fuel ratio sensor 2 and the signal from the feedback condition setting means 11 are inputted into the control device 7 and processed thereby. Furthermore, the signal based on the processed signal related to the concentration of the specific component in the exhaust gas detected by the upstream side air-fuel ratio sensor 1 and the downstream side air-fuel ratio sensor 2 are sent as a control signal from the control device 7 to the catalyst degradation warning means 10 and a warning is issued to an operator when appropriate.

Figure 2:
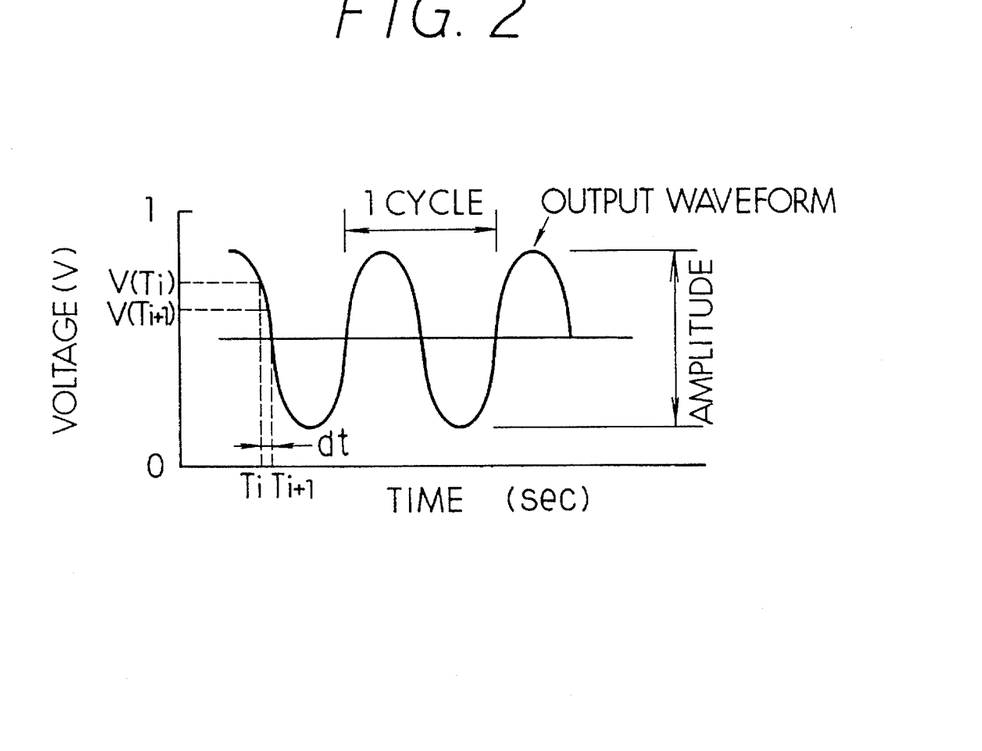
FIG. 2 is a chart illustrating the output waveform obtained from an air-fuel ratio sensor used in the system shown in FIG. 1.

FIG. 2 illustrates output waveform of the upstream side air-fuel ratio sensor 1 and downstream side air-fuel ratio sensor 2. In this figure, an amplitude is a voltage width of the output waveform, a period is one cycle of the output waveform, and higher responsiveness means that the period is shorter, i.e. the one cycle is shorter.

Figure 3:
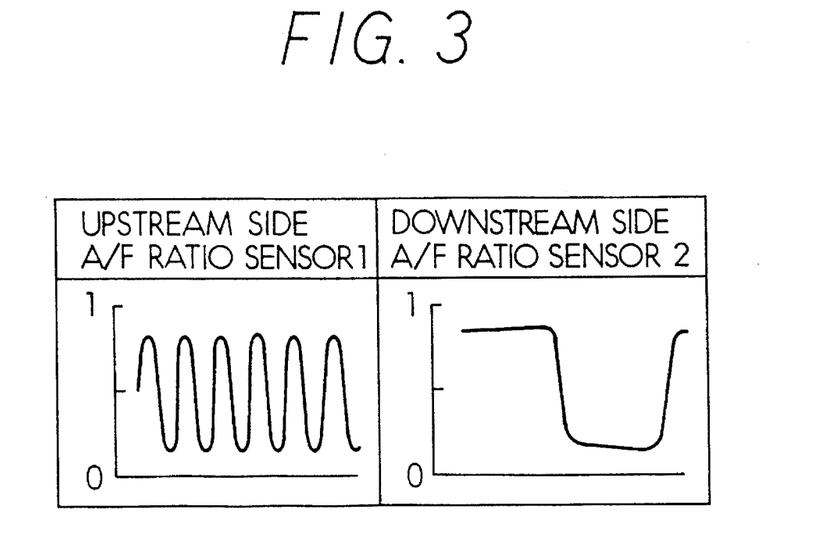
FIG. 3 is a chart illustrating examples of the output waveforms generated by the upstream side air-fuel ratio sensor and the downstream side air-fuel ratio sensor.

FIG. 3 illustrates output waveforms of the upstream side air-fuel ratio sensor 1 and downstream side air-fuel ratio sensor 2 generated by using a catalyst having a high purification ratio when feedback control is performed with the above air-fuel ratio control device. In this Figure, the output waveform of the downstream side air-fuel ratio sensor 2 indicates a more gentle transition compared with the output waveform of the upstream side air-fuel ratio sensor 1. This is due to the fact that the downstream side air-fuel ratio sensor 2 is exposed to the exhaust gas purified by the exhaust gas purifying catalyst provided within the catalytic converter 3.

The gentle transition of the output waveform of the downstream side air-fuel ratio sensor 2 can also be used for an output waveform deviation correction control operation for controlling the upstream side air-fuel ratio sensor 1. The gentle transition of the output waveform of the downstream side air-fuel ratio sensor 2 also means that the component composition of the exhaust gas is being reduced from its normal (uncatalyzed) composition.

Figure 4:
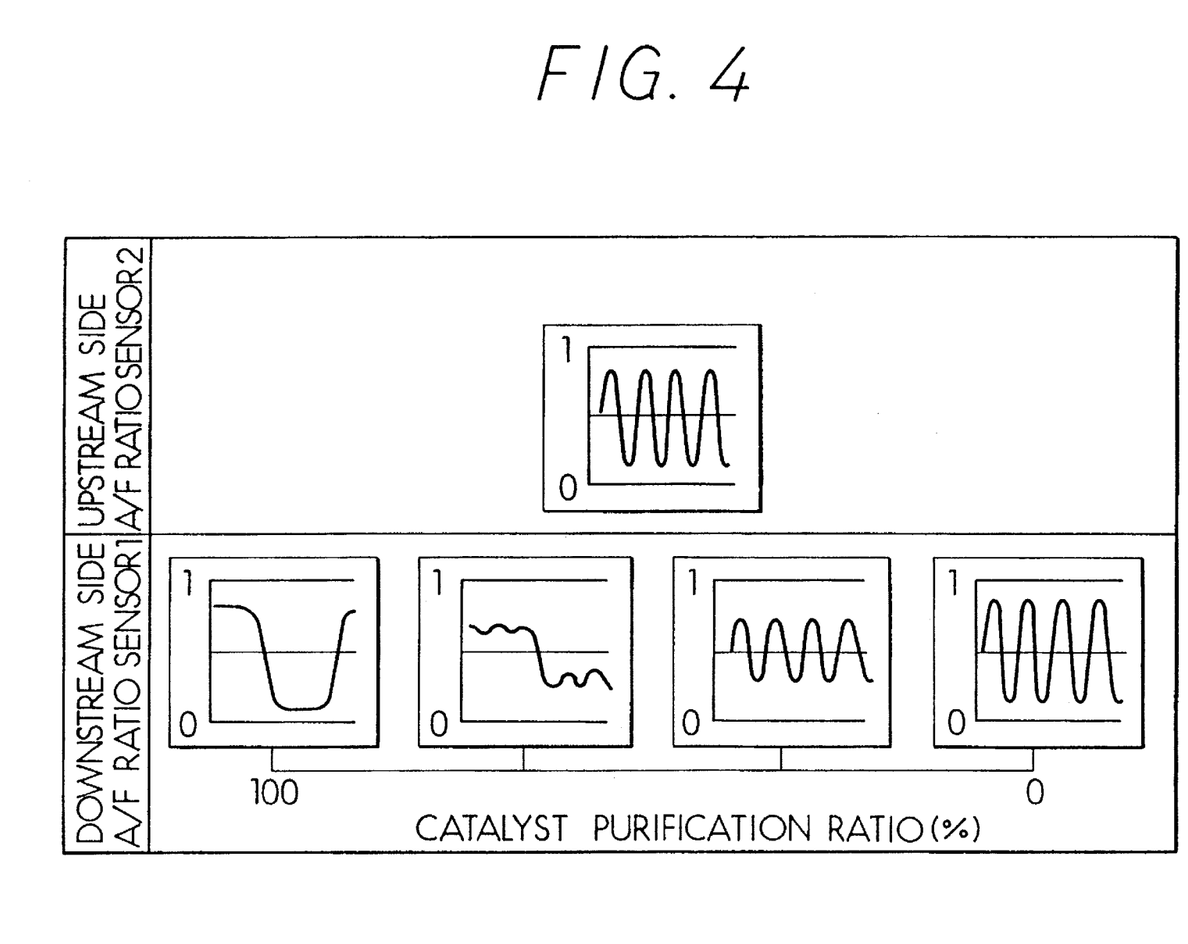
FIG. 4 is a chart illustrating the catalyst purification ratio and examples of the output waveforms obtained from the upstream side air-fuel ratio sensor and the downstream side air-fuel ratio sensor.

FIG. 4 illustrates the characteristic output waveforms of the upstream side air-fuel ratio sensor 1 and downstream side air-fuel ratio sensor 2 respectively with respect to the catalyst purification ratio (related to the catalyst degradation level). In this figure, a catalyst purification ratio (percentage) of 0% is equivalent to a catalyst degradation level of 100%. The characteristics of this case can be obtained from the locus ratio of the output waveform of the upstream side air-fuel ratio sensor 1 to the output waveform of the downstream side air-fuel ratio sensor 2 as follows:

$$\text{Locus ratio} = \frac{\text{Locus length of the output waveform of the downstream side air-fuel ratio sensor 2}}{\text{Locus length of the output waveform of the upstream side air-fuel ratio sensor 1}} \quad \text{[Equation 1]}$$

The locus of the output waveform from a specific time $t_0$ to a specified time $t_N$ based on the output V(t) per time dt by the following equation:

$$\text{Locus length of the output waveform} = \int_{t0}^{tN} \sqrt{1 + (V'(t))^2} \, dt \quad \text{[Equation 2]}$$

Figure 5:
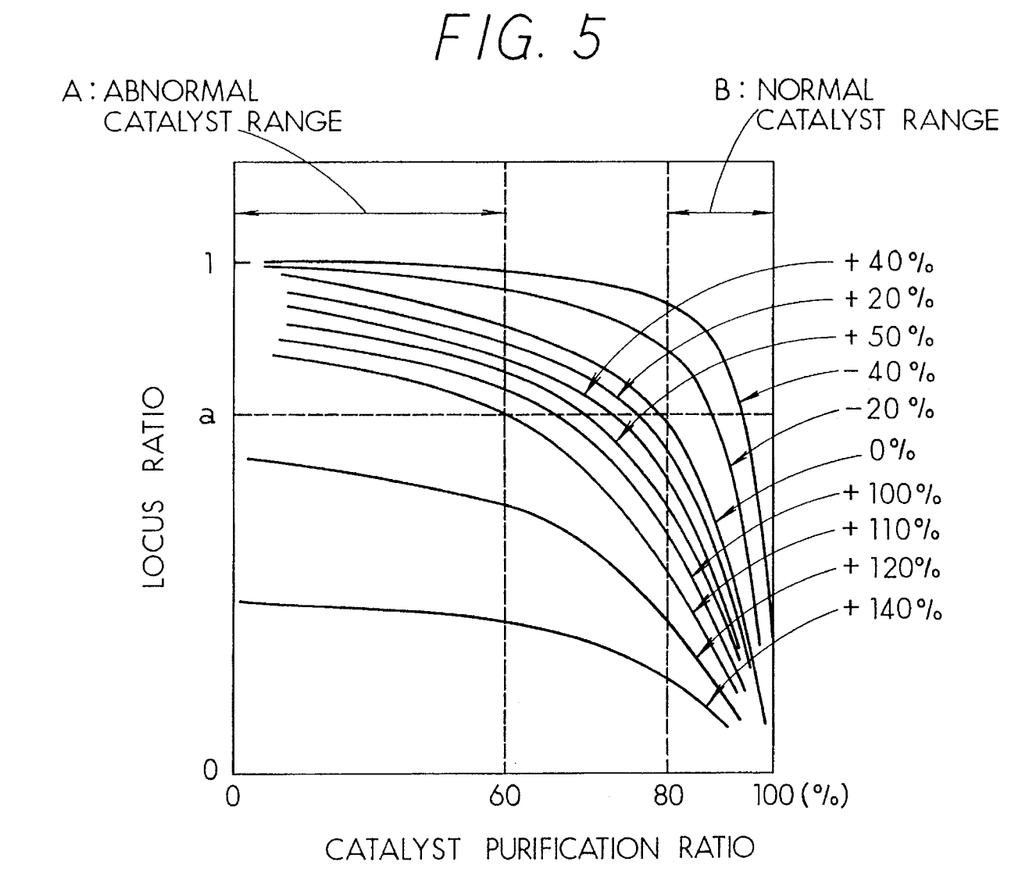
FIG. 5 is a graph illustrating the relationship between the catalyst purification ratio and the locus ratio of the air-fuel ratio control device.

FIG. 5 illustrates a graph which shows the relationship of the locus ratio to the catalyst purification ratio based on the above idea. In this figure, the percentage of the responsiveness of the downstream side air-fuel ratio sensor 2 to the responsiveness of the upstream side air-fuel ratio sensor 1 is indicated as a parameter (hereinafter referred to as "responsiveness percentage"). For example, when the responsiveness of the upstream side air-fuel ratio sensor 1 is 1 sec and the responsiveness of the downstream side air-fuel ratio sensor 2 is 0.8 sec, the responsiveness percentage is −20% {(0.8−1)/1×100%}. When the responsiveness of the upstream side air-fuel ratio sensor 1 is 1 sec and the responsiveness of the downstream side air-fuel ratio sensor 2 is 1.3 sec, the responsiveness percentage is +30% {(1.3−1)/1×100%}. The symbol A marked in this figure defines a range in which the catalyst has so degraded as to be judged to be an abnormal catalyst (catalyst purification percentage: 0% to 50−60%), while the symbol B marked in this figure defines a range within which the catalyst is normal (catalyst purification percentage: 80% to 90−100%) and should be judged to be a normal catalyst. The symbol a in this figure indicates the maximum acceptable locus ratio which is equal to 0.7 (when the locus ratio is equal to or more than the level a, the locus ratio is determined to be abnormal). From this graph, it is clear that when the responsiveness of the downstream side air-fuel ratio sensor 2 is higher than the responsiveness of the upstream side air-fuel ratio sensor 1, high responsiveness means lower value in the responsiveness percentage and the responsiveness percentage is, for example, −20% and −40% in FIG. 5.

As can be seen from FIG. 5, when the sensor exhibits negative responsiveness percentage ratios such as these, their high negative slopes when the purification ratio is close to 100% means that a relative small degradation in the purification ratio (e.g., a small movement to the left on the x-axis of the graph) results in a relatively large displacement towards the maximum acceptable locus ratio a (i.e., a large movement up the y-axis), thereby increasing the likelihood that the catalyst will be determined to be unacceptably degraded. Thus, the responsiveness of the downstream sensor 2 should be kept lower than that of the upstream sensor 1 to maintain a significant positive responsiveness percentage ratio and thereby avoid such determinations.

It should be noted, however, that the judgment value of this locus ratio, which is dependent on the exhaust gas purifying catalyst provided within the catalytic converter 3, should preferably be within a level range from 0.3 to 0.7. If the judgment value of the locus ratio is not within the level range from 0.3 to 0.7, the responsiveness of the upstream side air-fuel ratio sensor 1 and the responsiveness of the downstream side air-fuel ratio sensor 2 should be maintained within an extremely narrow range. This is considered to be extremely difficult, however, in view of the degree of the differences in responsiveness of air-fuel ratio sensors currently available and the environmentally caused changes thereof due to being mounted and used, and therefore the degradation detecting accuracy may not be improved. Furthermore, in order for toxic components to be purified and reduced in the exhaust gas, it goes without saying that the feedback control for the upstream side air-fuel ratio sensor 1 should preferably be high, and that the responsiveness of the upstream side air-fuel ratio sensor 1 should also preferably be high. Accordingly, it is not preferable that the judgment value a of the locus ratio is set to be in the neighborhood of 1. If the judgment value a of the locus ratio is set to be in the neighborhood of 0, the responsiveness of the downstream side air-fuel ratio sensor 2 is extremely lowered, and consequently feedback control is delayed. This is not conducive to the purification of toxic components in the exhaust gas. Therefore, by setting the responsiveness of the downstream side air-fuel ratio sensor 2 to a range delayed by 20% to 100% with respect to the upstream side sensor, the accuracy of the feedback control can be maintained and at the same time, the accuracy of the catalyst degradation determination can be improved.

For example, when the responsiveness of the upstream side air-fuel ratio sensor 1 is set to 1, the responsiveness of the downstream side air-fuel ratio sensor 2 is within a range from 1.2 to 2. If the responsiveness of the upstream side air-fuel ratio sensor 1 has a dispersion within a range from 0.9 to 1.1, the responsiveness of the downstream side air-fuel ratio sensor 2 may be set to have a dispersion within a range from 1.32 to 1.80. Particularly, when the responsiveness of the downstream side air-fuel ratio 2 is delayed by 40% to 50% the most advantageous effects can be obtained.

In this embodiment, catalyst degradation is judged by using parameters indicating the locus ratio, the catalyst purification ratio and the percentage of the responsiveness of the downstream side air-fuel ratio sensor 2 to the responsiveness of the upstream side air-fuel ratio sensor 1. It is acceptable, however, that the ratio of the output of the downstream side air-fuel ratio sensor 2 to the output of the upstream side air-fuel ratio sensor 1 is used instead.

As described above, by setting the percentage of the responsiveness of the downstream side air-fuel ratio sensor 2 to the responsiveness of the upstream side air-fuel ratio sensor 1 to a range delayed by about 20% to 100% or preferably by about 40% to 50%, the accuracy of the catalyst degradation determination process can be improved.

Next, a description will be given of a downstream side air-fuel ratio sensor 2 which can satisfy the above criteria.

Figure 6:
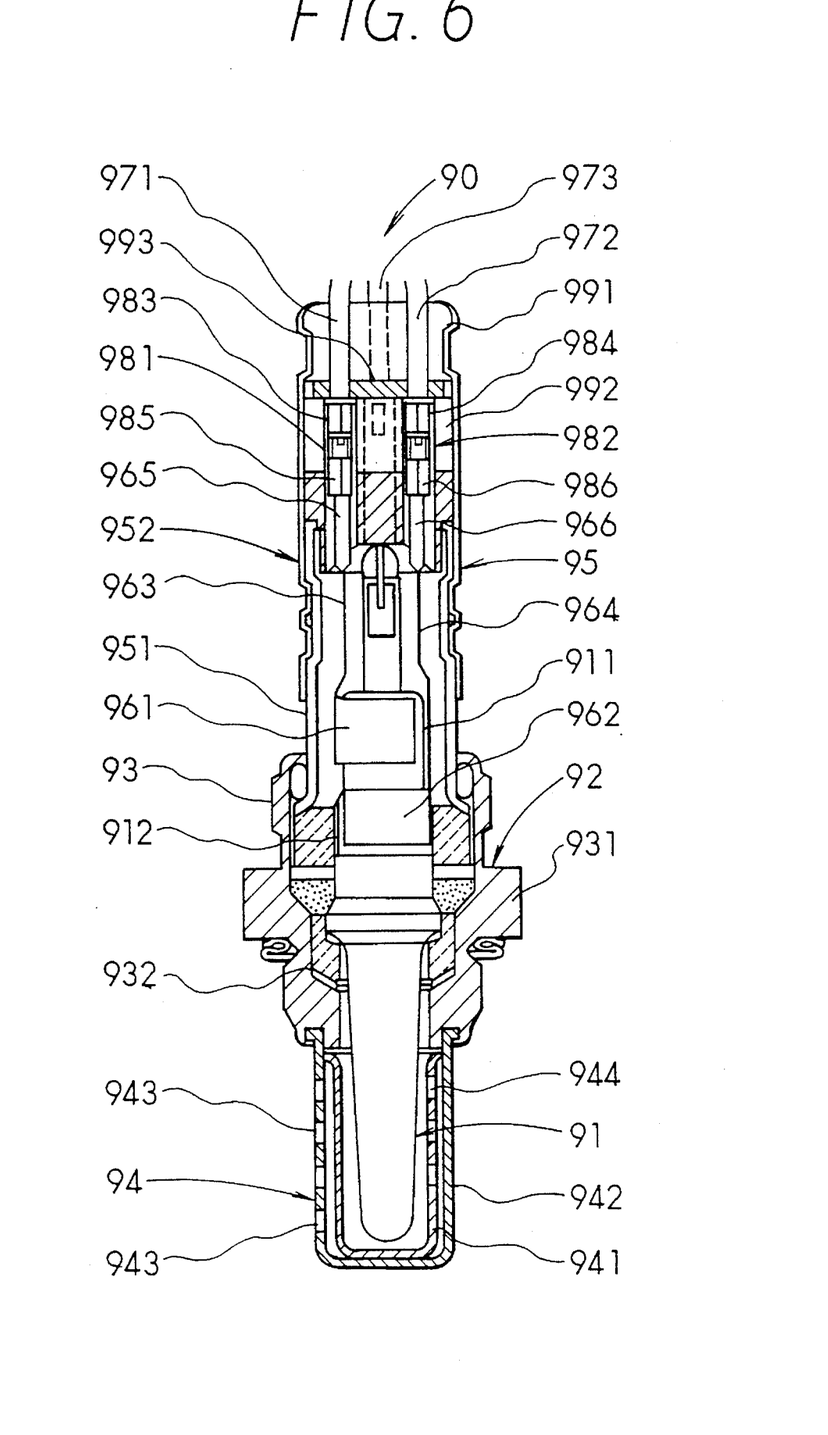
FIG. 6 is a cross-sectional view illustrating the air-fuel ratio sensor.

The upstream side air-fuel ratio sensor 1 and the downstream side air-fuel ratio sensor 2 are hereinafter referred to as "air-fuel ratio sensors". FIG. 6 illustrates the structure of an air-fuel ratio sensor 90. In this Figure, the air-fuel ratio sensor 90 has an oxygen detecting element 91 and a housing 92 for housing the oxygen detecting element 91. The housing 92 has a shell part 93 provided with a flange 931 at the roughly central part of the housing 92, an exhaust cover 94 at the lower part thereof which is to be inserted into an exhaust passage, and an atmosphere cover 95 at its upper part which is in contact with the atmosphere. The exhaust cover 94 has a stainless steel internal cover 941 and external cover 942. The internal cover 941 and the external cover 942 have air holes 943 and 944 respectively.

The atmosphere cover 95 has a main cover 951 attached to the shell part 93 and a sub cover 952 covering the rear end part of the main cover 951. The main cover 951 and the sub cover 952 are provided with respective atmosphere intake ports (not illustrated). The air-fuel ratio sensor 90 is held by the shell part 93 through an insulating part material 932. The oxygen detecting element 91 has an internal electrode 911 and an external electrode 912. The internal electrode 911 and the external electrode 912 are connected to, covered and held by metallic plate-like terminals 961 and 962 respectively. The plate-like terminals 961 and 962 are connected to output drawing lead wires 971 and 972 respectively. More specifically, the plate-like terminals 961 and 962 are projectingly provided with strip-like terminal pieces 963 and 964 against contact pieces 965 and 966. The strip-like terminal pieces 963 and 964 are connected to connectors 981 and 982 at ends thereof respectively whose respective other ends 983 and 984 are connected to the output drawing lead wires 971 and 972 respectively. The plate-like terminals 961 and 962 are formed by reforming reverse T-shape metal plates into a cylinder-like shape for holding the internal electrode 911 and the external electrode 912 respectively. An appropriate amount of contact pressure is applied between the plate-like terminals 961 and 962 and the internal electrode 911 and external electrode 912, respectively, by the elasticity of the metal plates. On the other hand, a working tensile force is applied on the output drawing lead wires 971 and 972 in the axial direction of the oxygen sensor 90. Therefore, the plate-like terminals 961 and 962 may be pulled and slid in the axial direction through the connectors 981 and 982 respectively. In order to prevent this displacement, an end part of the oxygen sensor 90 is provided with a stopper 993 between rubber bushings 991 and 992. This stopper 993, designed to prevent the displacement of the connectors 981 and 982, is made of a resin material for maintaining insulation between the output drawing lead wires 971 and 972. Incidentally, the reference number 973 denotes a wire for a heater for heating the oxygen detecting element 91. The exhaust cover 94 of the oxygen sensor 90 is inserted into the exhaust passage, and the flange 931 is used for fixing the oxygen sensor 90 to the exhaust passage. The oxygen sensor 90 of the above composition is an electrochemical cell provided with electrodes on both sides of a solid electrolyte which is an oxygen ion conductor. This electrochemical cell introduces the exhaust gas to one electrode and the atmosphere to the other electrode and detects the air-fuel ratio from the potential difference between the electrodes.

Now, the internal cover 941 and the external cover 942 will be described in detail.

Figure 7:
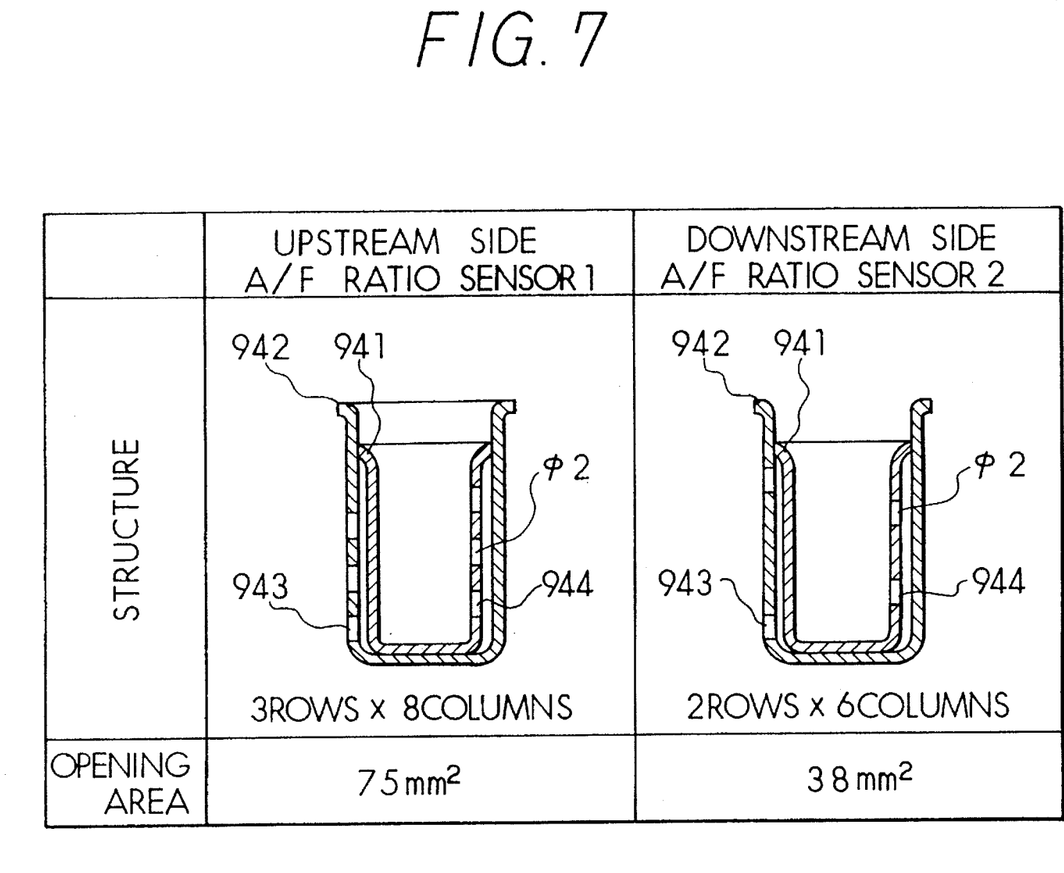
FIG. 7 is a cross-sectional view illustrating air holes of the air-fuel ratio sensor according to a preferred embodiment of the present invention.

In the internal cover 941 and external cover 942 of the upstream side air-fuel ratio sensor 1 have air holes 943 and 944 arranged in a pattern of 3 lines by 8 columns. Each of these air holes 943 and 944 is 2 mm in diameter, and the total opening area thereof is 75 mm². On the other hand, the internal cover 941 and external cover 942 of the downstream side air-fuel ratio sensor 2 have the air holes 943 and 944 arranged in a pattern of 2 lines by 6 columns. Each of the air holes 943 and 944 is 2 mm in diameter, and the total opening area thereof is 38 mm². (FIG. 7 illustrates this embodiment.) In this arrangement, the flow of the exhaust gas introduced from the air holes 943 and 944 made in the internal cover 941 and external cover 942 respectively of the downstream side air-fuel ratio sensor 2 is slower than the flow of the exhaust gas introduced from the air holes 943 and 944 made in the internal cover 941 and external cover 942 respectively of the upstream side air-fuel ratio sensor 1. Therefore, the responsiveness of the downstream side air-fuel ratio sensor 2 is lower than the responsiveness of the upstream side air-fuel ratio sensor 1. As a result of examination of the air holes 943 and 944 on various opening areas, it was found that the responsiveness of the downstream side air-fuel ratio sensor 2 was lowered when the following equation is established:

$$\text{Area ratio} = \frac{\text{Opening area of the air holes of the downstream side air-fuel ratio sensor 2}}{\text{Opening area of the air holes of the upstream side air-fuel ratio sensor 1}} < 1 \quad \text{[Equation 3]}$$

Furthermore, it is preferable that the area ratio should be set to be within a range from 0.1 to 0.9.

By providing a difference in the opening areas of the two sensors, the responsiveness of the downstream side air-fuel ratio sensor 2 can be delayed.

Although the above embodiment discloses a double-cover structure, the same effect can be achieved even by a single-cover structure.

Furthermore, in the above embodiment, the area ratio (area difference) of the holes made in the covers was used to provide a difference in responsiveness between the air-fuel ratio sensors disposed upstream and downstream from the catalyst. Besides this method, different design values may be employed for the thickness or porosity of the coating layer and the thickness and porosity of the electrode to vary the coating permeability and thereby provide similar results.

Moreover, any mode of the solid electrolyte is applicable, not only the oxygen concentration electromotive force but also TiO₂ mode which varies the resistance by oxygen concentration, or any other mode.

Also in the above embodiment, only one each of the the upstream side air-fuel ratio sensor and the downstream side air-fuel ratio sensor are provided. It goes without saying, however, that multiple upstream side air-fuel ratio sensors and downstream side air-fuel ratio sensor may be provided as well.

What is claimed is:

1. A catalyst degradation detecting apparatus comprising:
   at least a catalytic converter provided for purifying exhaust gas;
   an upstream side air-fuel ratio sensor provided on an upstream side of said catalytic converter for detecting a concentration of specific components within the exhaust gas and generating a first output waveform;
   a downstream side air-fuel ratio sensor provided on a downstream side of said catalytic converter for detecting a concentration of specific components within the exhaust gas and generating a second output waveform, said downstream side air-fuel ratio sensor being slower to change output than said upstream side air-fuel ratio in response to a change of the concentration of specific components of the exhaust gas;
   a control device for comparing said first and second output waveforms from said upstream and downstream side air-fuel ratio sensors to detect a catalyst degradation and issuing a signal in response thereto; and
   a catalyst degradation warning means which operates according to the signal received from said control device for generating a warning.

2. The catalyst degradation detecting apparatus according to claim 1, wherein said downstream side air-fuel ratio sensor changes output in response to a change in said concentration slower than said upstream side air-fuel ratio sensor by a range from 20% exclusive to 100% inclusive.

3. The catalyst degradation detecting apparatus according to claim 2, wherein said responsiveness of said upstream and downstream side air-fuel ratio sensor corresponds to one cycle of said output waveform.

4. A catalyst degradation detecting apparatus according to claim 3, wherein said control device processes said first and second output waveforms from said upstream and downstream side air-fuel ratio sensors based on a locus ratio of said first and second output waveforms and said locus ratio of said output waveforms is a ratio between locus length of the output waveforms of said air-fuel ratio sensors, and said locus length of said output waveforms of said air-fuel ratio sensors are expressed by the following equation:

$$\text{Locus length of the output waveform} = \int_{t0}^{tN} \sqrt{1 + (V'(t))^2} \, dt \quad \text{[Equation]}$$

where V(t) is the output.

5. The catalyst degradation detecting apparatus according to claim 4, wherein said locus ratio is expressed by the following equation:

$$\text{Locus ratio} = \frac{\text{Locus length of the output waveform of the downstream side air-fuel ratio sensor}}{\text{Locus length of the output waveform of the upstream side air-fuel ratio sensor}} \quad \text{[Equation]}$$

6. The catalyst degradation detecting apparatus according to claim 5, wherein said locus ratio is set to be within a range from 0.3 to 0.7.

7. The catalyst degradation detecting apparatus according to claim 5, wherein each of said upstream side and downstream side air-fuel ratio sensor comprises at least an oxygen detecting element which can output an output according to oxygen concentration, a housing provided on an upstream side and downstream side of said catalytic converter which purifies exhaust gas for housing the oxygen detecting element, and a means for extracting a signal from said oxygen detecting element, an exhaust cover inserted into an exhaust passage provided within said housing and having air holes, and an area ratio is so arranged as to be expressed by the following equation:

$$\text{Area ratio} = \frac{\text{Opening area of the air holes of the downstream side air-fuel ratio sensor}}{\text{Opening area of the air holes of the upstream side air-fuel ratio sensor}} < 1 \quad \text{[Equation]}$$

8. The catalyst degradation detecting apparatus according to claim 7, wherein said area ratio is set to a range from 0.1 to 0.9.

9. An apparatus for detecting degradation of a catalyst in a catalytic converter of an engine, said apparatus comprising:

an upstream air fuel ratio sensor having a first responsiveness based upon a time to change output in response to a change of the concentration of specific components of exhaust gas of said engine and being disposed in an exhaust system of said engine on an upstream side of said catalytic converter, said upstream sensor generating a signal responsive to a concentration of a component in exhaust gas in said exhaust system upstream of said catalytic converter;

a downstream air-fuel ratio sensor having a second responsiveness less than said first responsiveness and being disposed in said exhaust system on a downstream side of said catalytic converter, said downstream sensor generating a signal responsive to a concentration of said component in exhaust gas in said exhaust system downstream of said catalytic converter; and a controller receiving said signals from said upstream and downstream air-fuel ratio sensors for calculating a locus ratio between locus length of waveforms of said signals from said upstream and downstream air-fuel ratio sensors, based on said upstream and downstream component concentrations and for generating a warning signal when said locus ratio has a value indicative of a degraded catalyst.

10. The apparatus of claim 9, where said first and second responsiveness satisfy the inequality $$20\% \leq (D-U)/U \leq 100\%$$

where U is said first responsiveness and D is said second responsiveness.

11. The apparatus of claim 9, where the first and second responsiveness satisfy the inequality $$40\% \leq (D-U)/U \leq 50\%.$$

12. The apparatus of claim 9, wherein said signals from said upstream and downstream sensors are substantially periodic, and said first and second responsiveness correspond to periods of said upstream and downstream sensor signals, respectively.

13. The apparatus of claim 9, wherein each of said locus length are calculated according to the equation $$L = \int_{t_0}^{t_N} \sqrt{1 + (V'(t))^2}\, dt$$

where L is a locus of one of said waveforms, V'(t) is a first derivative of an equation describing said waveform, $t_0$ is a time at which a period of said waveform begins, and $t_N$ is a time at which a period of said waveform ends.

14. The apparatus of claim 9, wherein said locus ratio is calculated according to the equation $$LR = \frac{L_D}{L_U}$$

where $L_D$ is a locus of the waveform corresponding to the downstream sensor signal and $L_U$ is a locus of the waveform corresponding to the upstream sensor signal.

15. The apparatus of claim 14, wherein said upstream and downstream sensor are selected to satisfy the inequality $$0.3 < LR < 0.7.$$

16. The apparatus of claim 9, each of said sensors comprising:

a detecting element for generating an output signal responsive to a concentration of said component in exhaust gas contacting said element; and a cover enclosing said detecting element, said cover having holes for passing exhaust gas from said exhaust system through said cover to said detecting element;

wherein a total area of holes in a cover of said upstream sensor and a total area of holes in a cover of said downstream sensor satisfy the inequality $$\frac{A_D}{A_U} < 1$$

where $A_U$ is the total area of holes in the cover of the upstream sensor and $A_D$ is the total area of holes in the cover of the downstream sensor.

17. The apparatus of claim 16, wherein $$0.1 < \frac{A_D}{A_U} < 0.9$$

18. The apparatus of claim 16, wherein the detecting element of said upstream sensor and the detecting element of said downstream sensor are each oxygen detecting elements, and said component of said exhaust gas is oxygen.

19. The apparatus of claim 9, each of said sensors comprising:

a detecting element for generating an output signal responsive to a concentration of said component in exhaust gas contacting said element; and a coating layer covering said detecting element, each said coating layer having a predetermined permeability;

wherein a permeability of said downstream sensor coating layer is less than a permeability of said upstream sensor coating layer.

20. The apparatus of claim 19, wherein the downstream coating layer permeability is between 10% and 90% of the upstream coating layer permeability.

21. The apparatus of claim 9, each of said sensors comprising:

a detecting element generating an electromotive force responsive to a concentration of said component in exhaust gas contacting said element;

wherein said detecting element generates an electromotive force responsive to a concentration of oxygen in the exhaust gas.

22. The apparatus of claim 9, each of said sensors comprising:

a detecting element whose resistance varies responsive to a concentration of said component in exhaust gas contacting said element; and a bias source generating a bias signal to bias said detecting element so that each of said sensors generates an output signal of varying amplitude.

* * * * *